(12) United States Patent
Gormley (10) Patent No.: US 11,713,731 B2
(45) Date of Patent: Aug. 1, 2023

(54) VARIABLE AREA NOZZLE AND METHOD FOR OPERATING SAME

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/566,175

(22) Filed: Dec. 30, 2021

(65) Prior Publication Data

US 2023/0213002 A1 Jul. 6, 2023

(51) Int. Cl.
*F02K 1/62* (2006.01)
*F02K 1/12* (2006.01)

(52) U.S. Cl.
CPC ............. *F02K 1/62* (2013.01); *F02K 1/123* (2013.01); *F05D 2250/12* (2013.01); *F05D 2260/57* (2013.01)

(58) Field of Classification Search
CPC .......... F05D 2240/128; F05D 2240/14; F05D 2250/12; F05D 2260/57; F02K 1/11; F02K 1/12; F02K 1/1207; F02K 1/1223; F02K 1/60; F02K 1/605; F02K 1/62; F02K 1/625; F02K 1/763; F02K 1/775
See application file for complete search history.

(56) References Cited

U.S. PATENT DOCUMENTS

| | | | |
|---|---|---|---|
| 2,972,860 A | 2/1961 | Moy | |
| 3,579,991 A * | 5/1971 | Nelson, Jr. | F02K 1/60 60/229 |
| 4,093,122 A | 6/1978 | Linderman | |
| 4,196,856 A * | 4/1980 | James | F02K 1/1223 60/228 |
| 4,310,121 A * | 1/1982 | Basinski, Jr. | F02K 1/1223 239/265.33 |
| 4,690,329 A * | 9/1987 | Madden | F02K 1/62 239/265.19 |
| 4,966,327 A | 10/1990 | Fage | |
| 5,016,818 A * | 5/1991 | Nash | F02K 1/006 239/265.19 |
| 5,181,676 A | 1/1993 | Lair | |
| 6,170,255 B1 * | 1/2001 | Gonidec | F02K 1/70 60/226.2 |

(Continued)

OTHER PUBLICATIONS

EP search report for EP22217228.0 dated May 23, 2023.

*Primary Examiner* — Andrew H Nguyen
*Assistant Examiner* — Sean V Meiller
(74) *Attorney, Agent, or Firm* — Getz Balich LLC (57) ABSTRACT

A variable area nozzle assembly includes a fixed structure surrounding an exhaust duct extending along a nozzle axis. The fixed structure defines an exhaust duct outlet of the exhaust duct. The fixed structure includes a first side beam and a second side beam. Each of the first side beam and the second side beam extend in a direction axially aft from the exhaust duct outlet. Each of an upper thrust reverser door and a lower thrust reverser door are pivotably mounted to the first side beam and the second side beam at a first axial position. An upper panel and a lower panel are pivotably mounted to the upper thrust reverser door and the lower thrust reverser door, respectively, at a second axial position located axially forward of the first axial position. The upper panel and the lower panel define a nozzle outlet cross-sectional area therebetween.

14 Claims, 8 Drawing Sheets

(56) References Cited

U.S. PATENT DOCUMENTS

| | | | |
|---|---|---|---|
| 8,015,797 B2* | 9/2011 | Lair | F02K 1/60 |
| | | | 244/11 OB |
| 10,724,474 B2* | 7/2020 | Gormley | F02K 1/70 |
| 2003/0218094 A1 | 11/2003 | Lair | |
| 2018/0094605 A1* | 4/2018 | Rosenau | F02K 1/763 |
| 2019/0338727 A1 | 11/2019 | Gormley | |

* cited by examiner

VARIABLE AREA NOZZLE AND METHOD FOR OPERATING SAME

BACKGROUND

1. Technical Field

This disclosure relates generally to aircraft gas turbine engines, and more particularly to variable area nozzle assemblies for gas turbine engines.

2. Background Information

Turbojet engines for aircraft may frequently include variable area exhaust nozzles to accommodate subsonic, transonic, and supersonic speeds. Due to the different properties of exhaust gases as they flow through the nozzle at different speeds, there may be a need to vary the area of the nozzle at one or more locations within the nozzle in order to ensure proper and efficient turbojet operation over a range of aircraft flight conditions. What is needed are variable area nozzle assemblies which improve upon variable area nozzle assemblies conventionally known in the art.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for a gas turbine engine includes a fixed structure surrounding an exhaust duct extending along a nozzle axis. The fixed structure defines an exhaust duct outlet of the exhaust duct. The fixed structure includes a first side beam and a second side beam. Each of the first side beam and the second side beam extend in a direction axially aft from the exhaust duct outlet. The variable area nozzle assembly further includes an upper thrust reverser door and a lower thrust reverser door. Each of the upper thrust reverser door and the lower thrust reverser door are pivotably mounted to the first side beam and the second side beam at a first axial position. The variable area nozzle assembly further includes an upper panel and a lower panel. The upper panel and the lower panel are pivotably mounted to the upper thrust reverser door and the lower thrust reverser door, respectively, at a second axial position located axially forward of the first axial position. The upper panel and the lower panel define a nozzle outlet cross-sectional area therebetween.

In any of the aspects or embodiments described above and herein, the nozzle outlet cross-sectional area may have a rectangular cross-sectional shape.

In any of the aspects or embodiments described above and herein, the upper panel may be pivotable relative to the upper thrust reverser door about a second upper pivot axis located at the second axial position and the lower panel may be pivotable relative to the lower thrust reverser door about a second lower pivot axis located at the second axial position.

In any of the aspects or embodiments described above and herein, the upper panel and the lower panel may be pivotable about the second upper pivot axis and the second lower pivot axis, respectively, between a first position in which the upper panel and the lower panel define a maximum cross-sectional area of the nozzle outlet cross-sectional area and a second position in which the upper panel and the lower panel define a minimum cross-sectional area of the nozzle outlet cross-sectional area.

In any of the aspects or embodiments described above and herein, the upper thrust reverser door may be pivotable relative to the fixed structure about a first upper pivot axis located at the first axial position and the lower thrust reverser door may be pivotable relative to the fixed structure about a first lower pivot axis located at the second axial position.

In any of the aspects or embodiments described above and herein, the upper thrust reverser door and the lower thrust reverser door may be pivotable about the first upper pivot axis and the first lower pivot axis, respectively, between a stowed position and a deployed position.

In any of the aspects or embodiments described above and herein, the upper panel may be configured to remain fixed relative to the upper thrust reverser door as the upper thrust reverser door pivots between the stowed position and the deployed position and the lower panel may be configured to remain fixed relative to the lower thrust reverser door as the lower thrust reverser door pivots between the stowed position and the deployed position.

In any of the aspects or embodiments described above and herein, with the upper thrust reverser door and the lower thrust reverser door in the deployed position, the upper panel may be configured to contact the lower panel at a third axial position located axially aft of the first axial position.

In any of the aspects or embodiments described above and herein, each of the upper panel and the lower panel may include an inner nozzle flowpath surface extending between a forward axial end of the inner nozzle flowpath surface and an aft axial end of the inner nozzle flowpath surface In any of the aspects or embodiments described above and herein, the upper panel and the lower panel may be positioned between the first side beam and the second side beam and each of the upper thrust reverser door and the lower thrust reverser door may be pivotably mounted to the first side beam and the second side beam radially outside of the upper panel and the lower panel.

In any of the aspects or embodiments described above and herein, the first side beam may include a first inner member and a first outer member positioned radially outside of the first inner member and the second side beam may include a second inner member and a second outer member positioned radially outside of the second inner member.

In any of the aspects or embodiments described above and herein, the variable area nozzle assembly may further include a first actuation system mounted to one or both of the first outer member and the second outer member. The first actuation system may be connected to the upper panel and the lower panel and configured to pivot the upper panel and the lower panel relative to the upper thrust reverser door and the lower thrust reverser door, respectively.

In any of the aspects or embodiments described above and herein, the variable area nozzle assembly may further include a second actuation system mounted to the fixed structure. The second actuation system may be connected to the upper thrust reverser door and the lower thrust reverser door and configured to pivot the upper thrust reverser door, the lower thrust reverser door, the upper panel, and the lower panel relative to the fixed structure.

According to another aspect of the present disclosure, a method for operating a variable area nozzle assembly for a gas turbine engine is provided. The method includes pivoting an upper panel of a nozzle about an upper thrust reverser door. The upper panel is pivotably mounted to an upper thrust reverser door at a second axial position relative to a nozzle centerline. The method further includes pivoting a lower panel of a nozzle about a lower thrust reverser door. The lower panel is pivotably mounted to a lower thrust reverser door at the second axial position. The upper panel and the lower panel define a nozzle outlet cross-sectional area therebetween. The upper thrust reverser door is configured to pivot about a first upper pivot axis and the lower thrust reverser door is configured to pivot about a first lower pivot axis. The first upper pivot axis and the first lower pivot axis are located at a first axial position which is axially aft of the second axial position.

In any of the aspects or embodiments described above and herein, the nozzle outlet cross-sectional area may have a rectangular cross-sectional shape.

In any of the aspects or embodiments described above and herein, the upper panel and the lower panel may be pivotable about a second upper pivot axis and a second lower pivot axis, respectively, between a first position in which the upper panel and the lower panel define a maximum cross-sectional area of the nozzle outlet cross-sectional area and a second position in which the upper panel and the lower panel define a minimum cross-sectional area of the nozzle outlet cross-sectional area.

In any of the aspects or embodiments described above and herein, the upper thrust reverser door and the lower thrust reverser door may be pivotably mounted to a first side beam and a second side beam of a fixed structure. The fixed structure may surround an exhaust duct extending along the nozzle axis. The fixed structure may define an exhaust duct outlet of the exhaust duct. Each of the first side beam and the second side beam may extend in a direction axially aft from the exhaust duct outlet.

In any of the aspects or embodiments described above and herein, the steps of pivoting the upper panel and pivoting the lower panel may include pivoting the upper panel and pivoting the lower panel with a nozzle actuation system mounted to the first side beam and the second side beam.

In any of the aspects or embodiments described above and herein, the upper thrust reverser door and the lower thrust reverser door may be pivotable about the first upper pivot axis and the first lower pivot axis, respectively, between a stowed position and a deployed position.

In any of the aspects or embodiments described above and herein, the upper panel may be configured to remain fixed relative to the upper thrust reverser door as the upper thrust reverser door pivots between the stowed position and the deployed position and the lower panel may be configured to remain fixed relative to the lower thrust reverser door as the lower thrust reverser door pivots between the stowed position and the deployed position.

The present disclosure, and all its aspects, embodiments and advantages associated therewith will become more readily apparent in view of the detailed description provided below, including the accompanying drawings.

DETAILED DESCRIPTION

Figure 1:
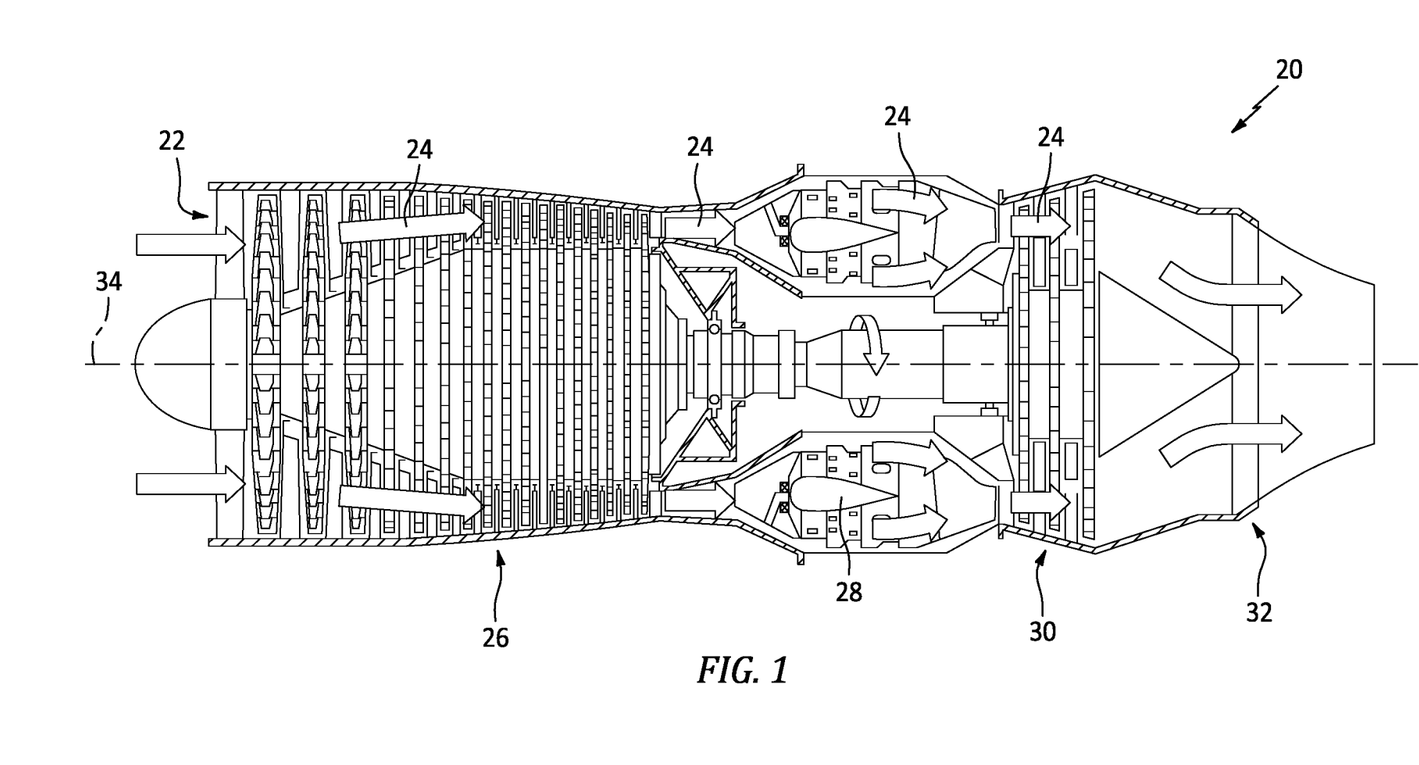
FIG. 1 illustrates a side cutaway view of a gas turbine engine, in accordance with one or more embodiments of the present disclosure.

Referring to FIG. 1, an exemplary gas turbine engine 20 capable of using aspects of the present disclosure is schematically illustrated. Although depicted as a turbojet gas turbine engine in the disclosed non-limiting embodiments, it should be understood that the concepts described herein are not limited to use with turbojets and may be applicable to other configurations of aircraft gas turbine engines as well including, but not limited to turboprop and turbofan gas turbine engines.

The gas turbine engine 20 generally includes inlet structure 22 through which ambient air is directed along a core flow path 24, a compressor 26 for pressurizing the air received from the inlet structure 22 and a combustor 28 wherein the compressed air is mixed with fuel and ignited for generating combustion gases. The gas turbine engine 20 further includes a turbine section 30 for extracting energy from the combustion gases. The resultant combustion gases from the combustor 28 are expanded over the turbine section 30 and then exhausted via an exhaust section 32, thereby providing thrust. The compressor 26, combustor 28, and turbine 30 are typically all concentric about a common axial centerline 34 of the gas turbine engine 20.

The gas turbine engine 20 may further include a low-pressure compressor located upstream of a high-pressure compressor and a high-pressure turbine located upstream of a low-pressure turbine. For example, the compressor 26 may be a multi-stage compressor 26 that has a low-pressure compressor and a high-pressure compressor and the turbine 30 may be a multistage turbine 30 that has a high-pressure turbine and a low-pressure turbine. In one embodiment, the low-pressure compressor may be connected to the low-pressure turbine by a low-pressure shaft and the high-pressure compressor may be connected to the high-pressure turbine by a high-pressure shaft.

Referring to FIGS. 2-5, aspects of the present disclosure include a variable area nozzle assembly 36 for the exhaust section 32 (see FIG. 1). The variable area nozzle assembly 36 generally includes a fixed structure 38 of the gas turbine engine 20 which may be configured as or otherwise include, for example, a core cowling, an engine nacelle, or other suitable fixed structure of the gas turbine engine 20. The fixed structure 38 surrounds an exhaust duct 40 generally extending along a nozzle centerline 42 which may or may not be colinear with the axial centerline 34 of the gas turbine engine 20 (see FIG. 1). The exhaust duct 40 is configured to direct exhaust gases along at least a portion of the core flow path 24 from the turbine section 30 to a variable area nozzle 44 mounted to the fixed structure 38 and located at a downstream end of the exhaust section 32. In some embodiments, the exhaust duct may additionally be configured to direct gases from a bypass flowpath to the nozzle 44. As shown, for example, in FIG. 3, the nozzle 44 may be configured as a convergent-divergent nozzle. However, the present disclosure is not limited to this particular nozzle configuration and aspects of the present disclosure may be applicable to other configurations of variable area nozzles as well.

The fixed structure 38 defines an exhaust duct outlet 46 of the exhaust duct 40 at a downstream end of the exhaust duct 40. The fixed structure 38 further includes a first side beam 48 disposed on a first lateral side 50 of the fixed structure 38 and a second side beam 52 disposed on a second lateral side 54 of the fixed structure 38. The side beams 48, 52 extend in a generally aftward direction from the axial location of the exhaust duct outlet 46 to respective distal ends 56. As will be discussed in further detail, each of the side beams 48, 52 may include an inner member 58 and an outer member 60 positioned radially outside of the inner member 58. Each of the side beams 48, 52 may also include a detachable fairing 62 covering portions of the respective side beams 48, 52.

The nozzle 44 includes an upper panel 64 and a lower panel 66. The panels 64, 66 extend between a forward end 68 and an aft end 70. The panels 64, 66 include a lateral portion 72 extending between the forward end 68 and the aft end 70 and further extending laterally between a first lateral end 74 and a second lateral end 76. The panels 64, 66 further include a first vertical portion 78 and a second vertical portion 80. The first vertical portion 78 extends inward from the first lateral end 74 of the lateral portion 72 (e.g., the first vertical portion 78 extends substantially perpendicular to the lateral portion 72). The second vertical portion 80 extends inward from the second lateral end 76 of the lateral portion 72 (e.g., the second vertical portion 80 extends substantially perpendicular to the lateral portion 72). The lateral portion 72 includes an inner side 82 and an outer side 84 opposite the inner side 82. The outer side 84 may define an exterior portion of the nozzle 44 while the inner side 82 may face the nozzle centerline 42. The inner side 82 and the outer side 84 may be joined at the aft end 70 but may be spaced from one another at the forward end 68. It should be understood that relative positional terms, such as "forward," "aft," "upper," "lower," "above," "below," "upstream," "downstream," "lateral," "vertical," and the like are relative to the normal operational attitude of the gas turbine engine 20 and should not be considered otherwise limiting.

The inner side 82 of the lateral portion 72 for each of the panels 64, 66 defines an inner nozzle flowpath surface 86 which is exposed to and directs exhaust gases passing through the nozzle 44. The inner nozzle flowpath surface 86 extends between a forward axial end 88 of the inner nozzle flowpath surface 86 and an aft axial end 90 of the inner nozzle flowpath surface 86 which may coincide with the aft end 70 of the respective panel 64, 66. In some embodiments, the inner nozzle flowpath surface 86 may be substantially straight (e.g., flat) between the forward axial end 88 and the aft axial end 90, however, the present disclosure is not limited to this particular configuration of the inner nozzle flowpath surface 86.

Figure 3:
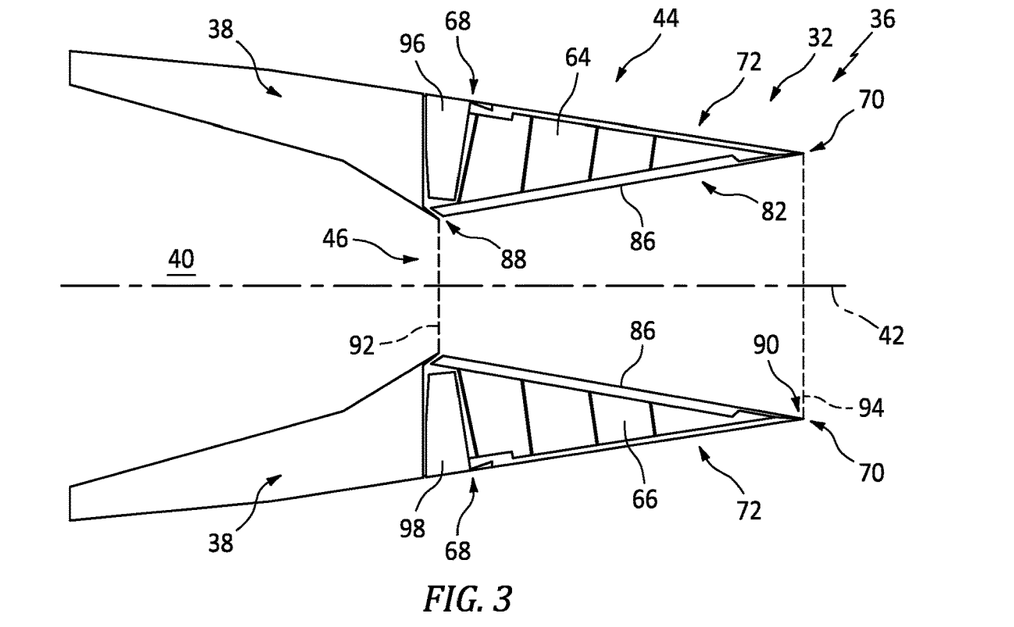
FIG. 3 illustrates a cross-sectional view of the variable area nozzle assembly of FIG. 2 taken along Line 3-3, in accordance with one or more embodiments of the present disclosure.
Figure 5:
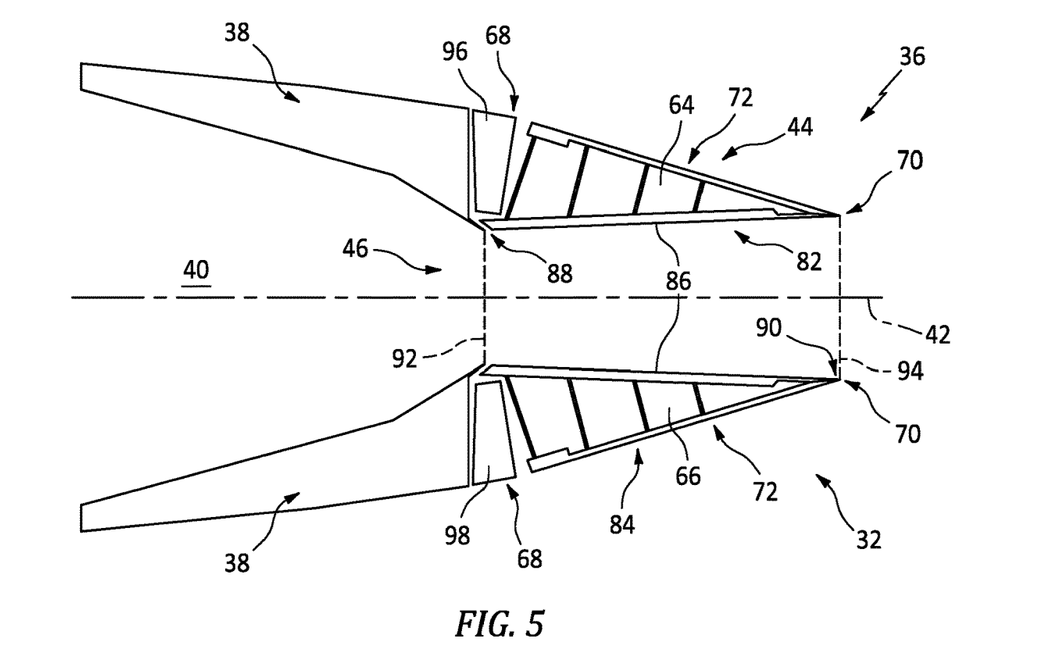
FIG. 5 illustrates a cross-sectional view of the variable area nozzle assembly of FIG. 4 taken along Line 5-5, in accordance with one or more embodiments of the present disclosure.
Figure 6:
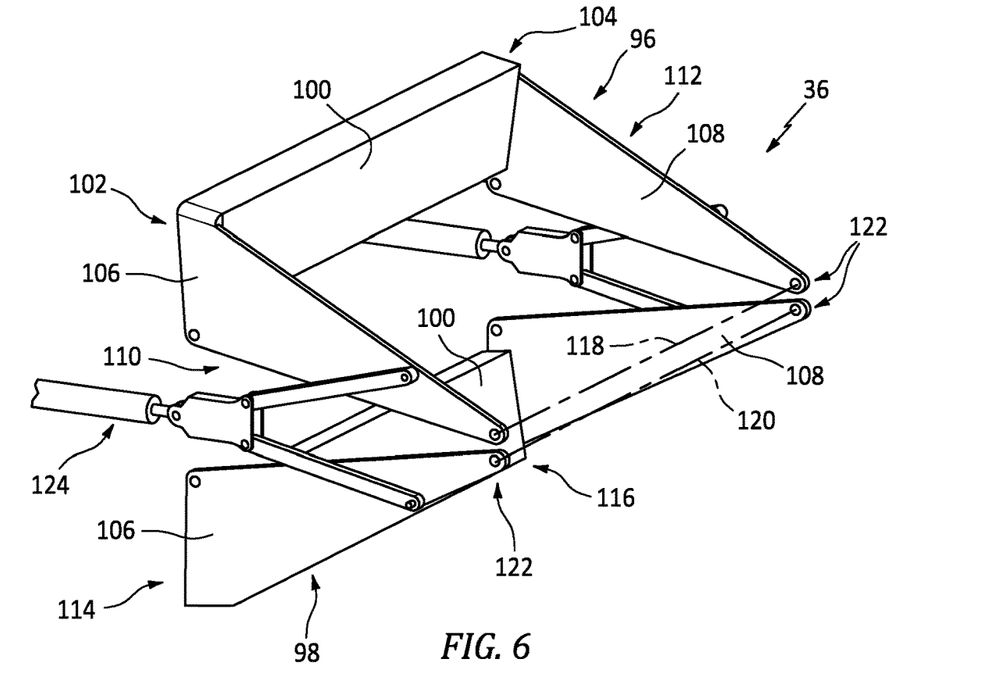
FIG. 6 illustrates a perspective view of a portion of a variable area nozzle assembly, in accordance with one or more embodiments of the present disclosure.
Figure 7:
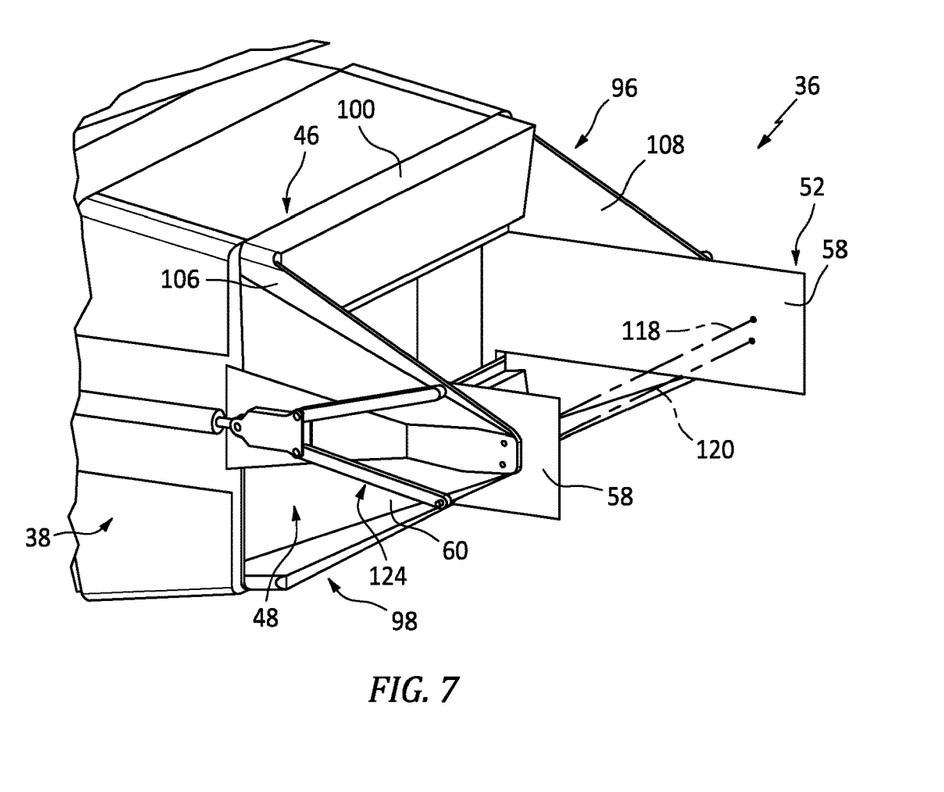
FIG. 7 illustrates a perspective view of a portion of a variable area nozzle assembly, in accordance with one or more embodiments of the present disclosure.
Figure 8:
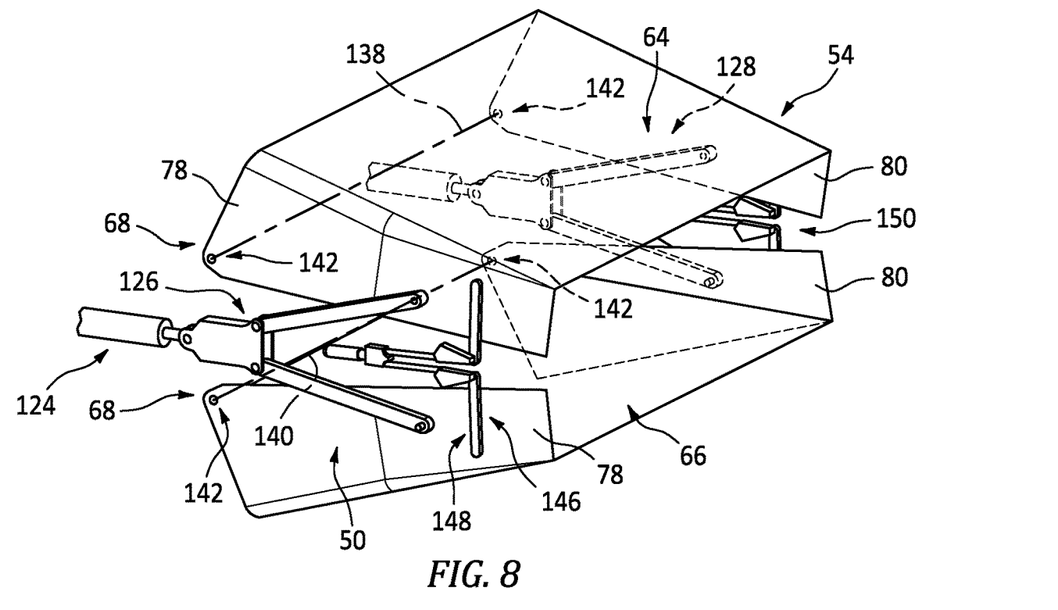
FIG. 8 illustrates a perspective view of a portion of a variable area nozzle assembly, in accordance with one or more embodiments of the present disclosure.
Figure 9:
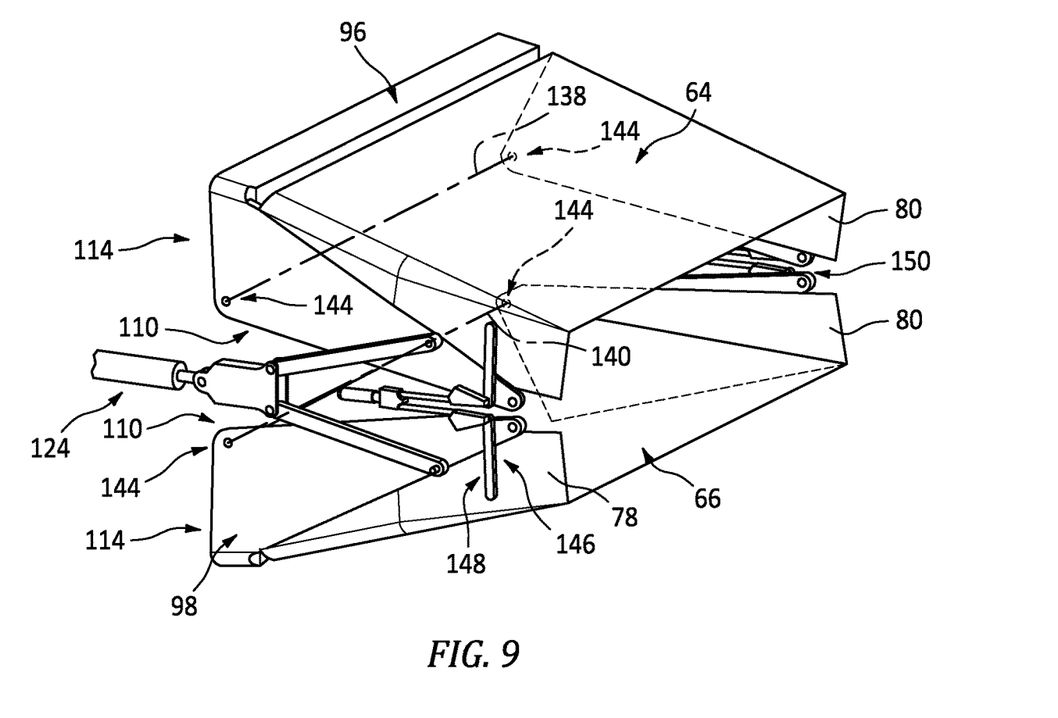
FIG. 9 illustrates a perspective view of a portion of a variable area nozzle assembly, in accordance with one or more embodiments of the present disclosure.

The nozzle 44 includes an upstream A8 axial portion which may be a converging portion of the nozzle 44. As shown in FIGS. 3 and 5, the fixed structure 38 may define a throat cross-sectional area 92, within the A8 axial portion of the nozzle 44, at a downstream end of the fixed structure 38, which may coincide with the exhaust duct outlet 46. Accordingly, the throat cross-sectional area 92 may be a fixed cross-sectional area of the nozzle 44. However, aspects of the present disclosure are not limited to this particular configuration of the A8 axial portion of the nozzle 44. For example, aspects of the present disclosure may be incorporated on nozzles having a variable A8 axial portion having one or more mechanical features (e.g., doors, panels, petals, etc.) configured to vary a cross-sectional size of the throat cross-sectional area (e.g., the throat cross-sectional area 92) and which may be positioned between the panels 64, 66 and the fixed structure 38.

Figure 2:
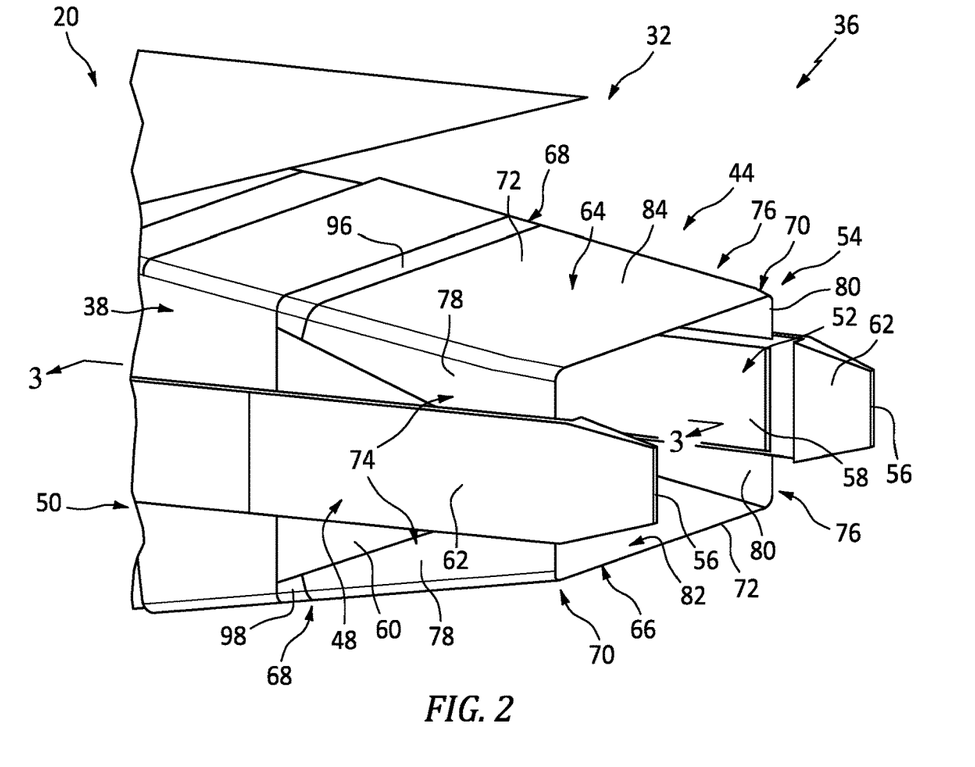
FIG. 2 illustrates a perspective view of a variable area nozzle assembly including a nozzle in a maximum A9 position, in accordance with one or more embodiments of the present disclosure.
Figure 4:
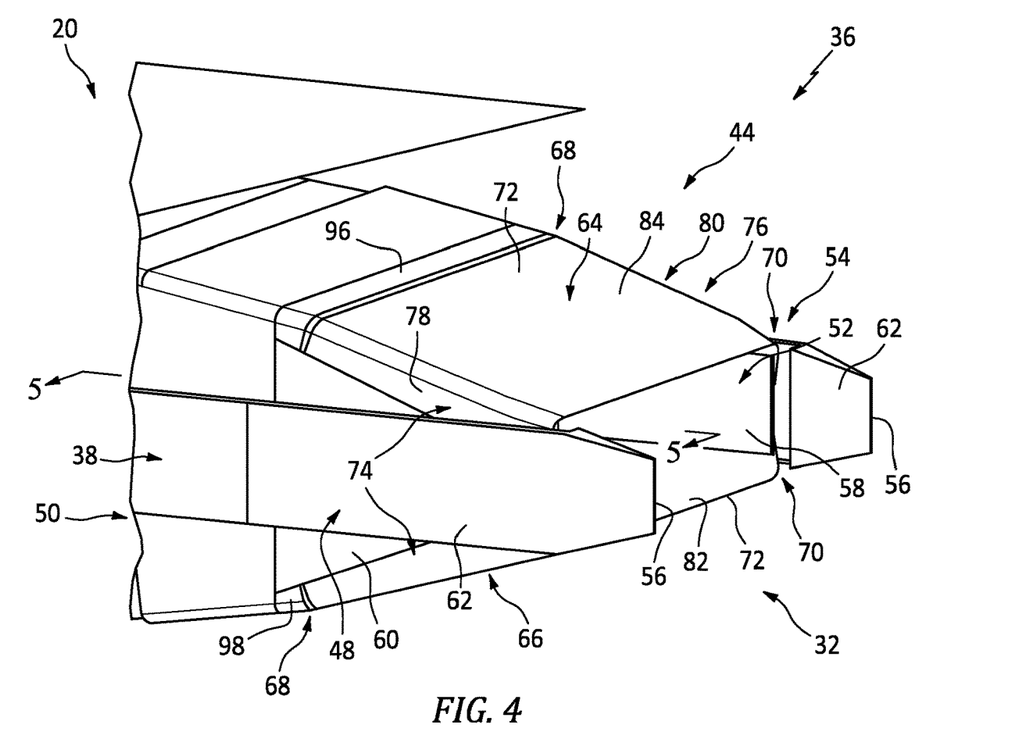
FIG. 4 illustrates a perspective view of a variable area nozzle assembly including a nozzle in a minimum A9 position, in accordance with one or more embodiments of the present disclosure.

The nozzle 44 further includes a downstream A9 axial portion which may be a diverging portion of the nozzle 44. The A9 axial portion is defined along the axial span of the inner nozzle flowpath surface 86 from the forward axial end 88 at or proximate the throat cross-sectional area 92 (e.g., the downstream end of the fixed structure 38) to the aft axial end 90. As shown in FIGS. 3 and 5, the panels 64, 66 define a variable outlet cross-sectional area 94 of the nozzle 44 therebetween, at the respective aft ends 70 of the panels 64, 66. As will be discussed in further detail, the panels 64, 66 are pivotable, relative to the nozzle centerline 42, to control a cross-sectional area of the outlet cross-sectional area 94. As shown in FIGS. 2 and 3, for example, the panels 64, 66 are positioned in a radially outermost position such that the inner nozzle flowpath surface 86 defines a maximum area of the outlet cross-sectional area 94 (e.g., a maximum A9 position). The maximum A9 position may typically be a position of the nozzle 44 during cruising operations and/or when operating at supersonic speeds. As shown in FIGS. 4 and 5, for example, the panels 64, 66 are positioned in a radially innermost position such that the inner nozzle flowpath surface 86 defines a minimum area of the outlet cross-sectional area 94 (e.g., a minimum A9 position). The outlet cross-sectional area 94, as well as other portions of the nozzle 44, may have a rectangular or substantially rectangular cross-sectional shape (e.g., the outlet cross-sectional area 94 may be bounded, at least in part, by two substantially parallel lateral sides and two substantially parallel vertical sides). However, the present disclosure is not limited in application to only nozzles having rectangular or substantially rectangular cross-sectional shapes.

Referring to FIGS. 2-6, 7, 10, and 11, the variable area nozzle assembly 36 includes an upper thrust reverser door 96 and a lower thrust reverser door 98. Each thrust reverser door 96, 98 includes a lateral portion 100 extending between a first lateral end 102 and a second lateral end 104. Each thrust reverser door 96, 98 further includes a first axial portion 106 extending in a generally axial direction from the first lateral end 102 and a second axial portion 108 extending in a generally axial direction from the second lateral end 104. The axial portions 106, 108 each extend between an inner side 110 and an outer side 112 and axially between a forward axial end 114 coincident with the respective lateral portion 100 and an aft axial end 116.

Each of the thrust reverser doors 96, 98 is pivotably mounted to the side beams 48, 52 of the fixed structure 38. The upper thrust reverser door 96 is configured to pivot relative to the side beams 48, 52 about an upper pivot axis 118 and the lower thrust reverser door 98 is configured to pivot relative to the side beams 48, 52 about a lower pivot axis 120. Although the pivot axes 118, 120 are illustrated in FIGS. 6, 7, 10, and 11 as being substantially parallel, the present disclosure is not limited to parallel pivot axes 118, 120. The thrust reverser doors 96, 98 may include pivot apertures 122 positioned proximate the aft axial end 116 of the axial portions 106, 108 by which the thrust reverser doors 96, 98 may be pivotably mounted (e.g., by mechanical fasteners) to the side beams 48, 52 to pivot about the respective upper pivot axis 118 and lower pivot axis 120. The thrust reverser doors 96, 98 may be pivotably mounted to the side beams 48, 52 such that the first axial portion 106 of each thrust reverser door 96, 98 is positioned radially between the inner member 58 and the outer member 60 of the first side beam 48 and the second axial portion 108 of each thrust reverser door 96, 98 is positioned radially between the inner member 58 and the outer member 60 of the second side beam 52. As will be discussed in further detail, the thrust reverser doors 96, 98 are configured to pivot about the respective pivot axes 118, 120 between a stowed position (see, e.g., FIGS. 6 and 7), in which the respective lateral portions 100 are disposed proximate or in contact with the fixed structure 38 at the exhaust duct outlet 46, and a deployed position (see, e.g., FIG. 13), in which the respective lateral portions 100 are spaced axially aft of the exhaust duct outlet 46 to effect, in part, post-exit thrust reversal for the gas turbine engine 20. In some embodiments, the variable area nozzle assembly 36 may include one or more locking devices between the thrust reverser doors 96, 98 and the fixed structure 38 to prevent inadvertent actuation of the thrust reverser doors 96, 98.

The variable area nozzle assembly 36 may include a thrust reverser actuation system 124 configured to effect pivoting of the thrust reverser doors 96, 98 between the stowed and deployed positions. In FIGS. 6, 7, 10, and 11, illustration of the fairing 62 has been omitted to more clearly illustrate the actuation system 124. The thrust reverser actuation system 124 may include a first actuation assembly 126 located on the first lateral side 50 of the fixed structure 38 and a second actuation assembly 128 located on the second lateral side 54 of the fixed structure 38. Each of the actuation assemblies 126, 128 may be configured as a four-bar actuation assembly. Each of the actuation assemblies 126, 128 may include an actuator 130 mounted to the fixed structure 38 and extending in a generally axial direction along the fixed structure 38. The actuator 130 includes a carrier 132 positioned at an axially aft end of the actuator 130 and configured to translate in a generally axial direction is response to actuation of the actuator 130. Each of the actuation assemblies 126, 128 further includes an upper linkage 134 rotatably mounted to the carrier 132 at a first end of the upper linkage 134 and rotatably mounted to one of the first axial portion 106 or the second axial portion 108 of the upper thrust reverser door 96 axially between the forward axial end 114 and the aft axial end 116 at a second end of the upper linkage 134. Similarly, each of the actuation assemblies 126, 128 further includes a lower linkage 136 rotatably mounted to the carrier 132 at a first end of the lower linkage 136 and rotatably mounted to one of the first axial portion 106 or the second axial portion 108 of the lower thrust reverser door 98 axially between the forward axial end 114 and the aft axial end 116 at a second end of the lower linkage 136. The actuator 130 may include a pneumatic actuator, a hydraulic actuator, an electrical-mechanical actuator, or the like, and the present disclosure is not limited to any particular configuration of the actuator 130. Moreover, the present disclosure is not limited to the use of the thrust reverser actuation system 124 to effect pivoting of the thrust reverser doors 96, 98 between the stowed and deployed positions and other actuation system configurations may be contemplated within the scope of the present disclosure.

Referring to FIGS. 8-13, each of the upper panel 64 and the lower panel 66 is pivotably mounted to a respective one of the upper thrust reverser door 96 and the lower thrust reverser door 98. The upper panel 64 and the lower panel 66 are pivotably mounted to the respective upper thrust reverser door 96 and lower thrust reverser door 98 at an axial position which is located axially forward of the axial position at which the thrust reverser doors 96, 98 are pivotably mounted to the side beams 48, 52 (e.g., the axial location of the pivot axes 118, 120). The upper panel 64 is configured to pivot relative to the upper thrust reverser door 96 about an upper pivot axis 138. Similarly, the lower panel 66 is configured to pivot relative to the lower thrust reverser door 98 about a lower pivot axis 140. The panels 64, 66 may include pivot apertures 142 in the first vertical portion 78 and the second vertical portion 80 proximate the respective forward ends 68 of the panels 64, 66. The thrust reverser doors 96, 98 may include corresponding pivot apertures 144 positioned proximate the forward axial end 114 and the inner side 110 of the axial portions 106, 108 by which pivot apertures 142 and pivot apertures 144 of the panels 64, 66 may be pivotably mounted (e.g., with mechanical fasteners) to the respective thrust reverser doors 96, 98 to pivot about the respective upper pivot axis 138 and lower pivot axis 140. Accordingly, the panels 64, 66 are pivotable, relative to thrust reverser doors 96, 98, to control a cross-sectional area of the outlet cross-sectional area 94 (see FIGS. 3 and 5).

Figure 10:
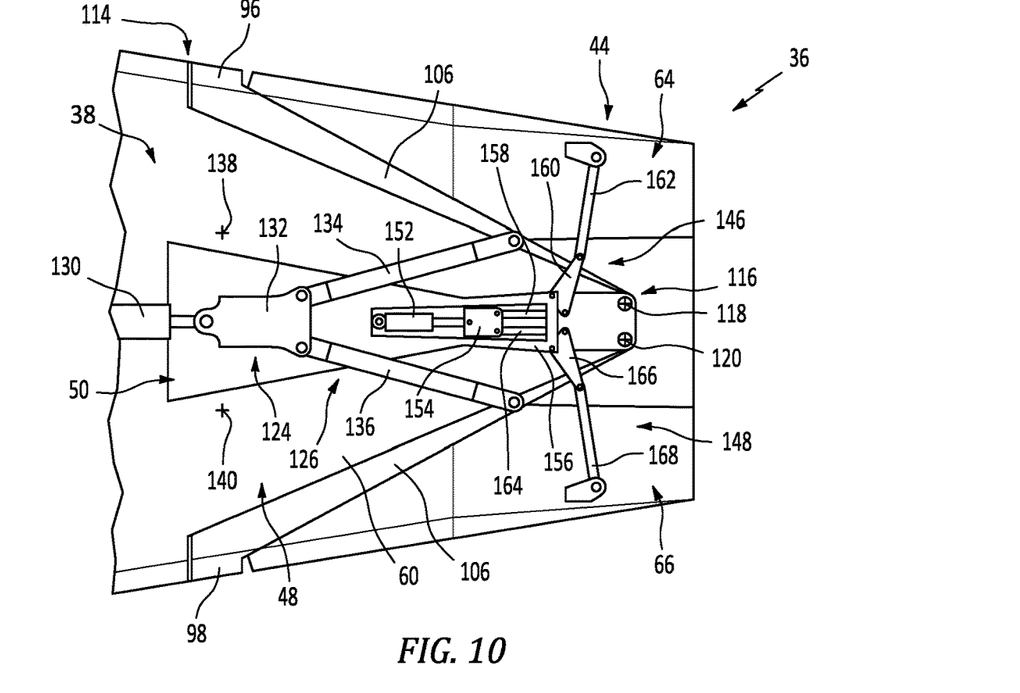
FIG. 10 illustrates a side cutaway view of a variable area nozzle assembly including a nozzle in a maximum A9 position, in accordance with one or more embodiments of the present disclosure.
Figure 11:
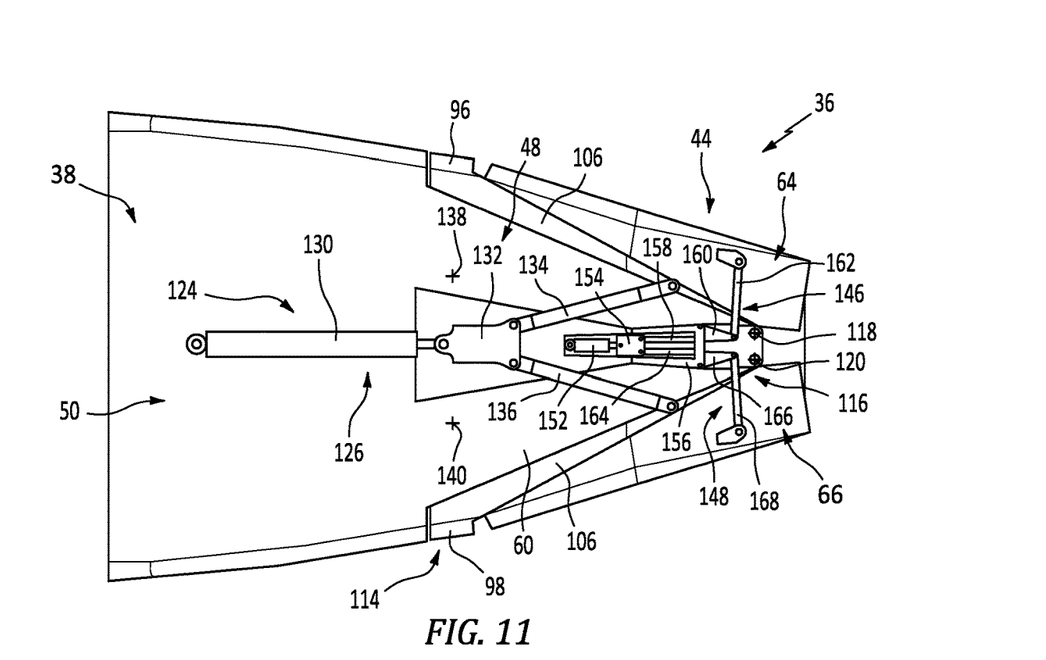
FIG. 11 illustrates a side cutaway view of a variable area nozzle assembly including a nozzle in a minimum A9 position, in accordance with one or more embodiments of the present disclosure.
Figure 12:
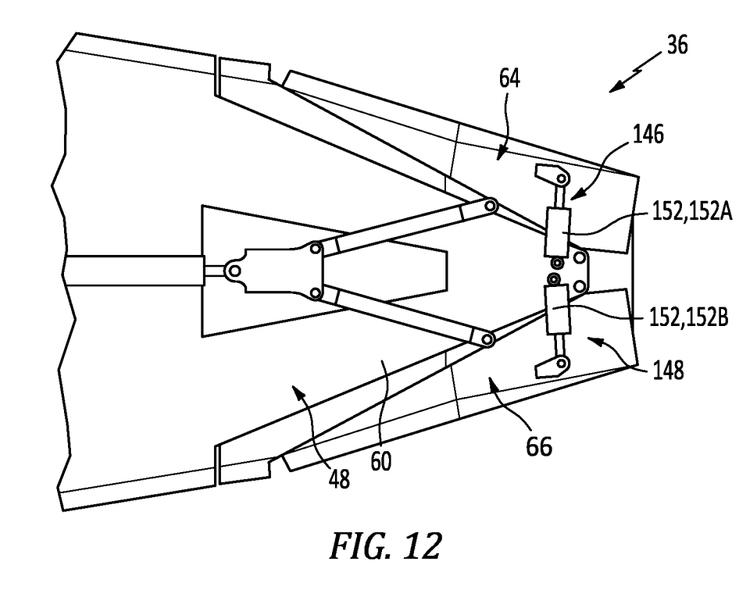
FIG. 12 illustrates a side cutaway view of a variable area nozzle assembly, in accordance with one or more embodiments of the present disclosure.

The variable area nozzle assembly 36 may include a nozzle actuation system 146 configured to effect pivoting of the panels 64, 66 between the maximum A9 position (see FIG. 10), the minimum A9 position (see FIG. 11), and a plurality of positions therebetween. In FIGS. 10-12, illustration of the fairing 62 has been omitted to more clearly illustrate the actuation system 146. The nozzle actuation system 146 may include a first actuation assembly 148 located on the first lateral side 50 of the fixed structure 38 and a second actuation assembly 150 located on the second lateral side 54 of the fixed structure 38. Each of the actuation assemblies 148, 150 may be configured as a four-bar actuation assembly. Each of the actuation assemblies 148, 150 may include at least one actuator 152. The at least one actuator 152 may be mounted to a respective one of the first side beam 48 and the second side beam 52 and may extend in a generally axial direction.

In some embodiments, the at least one actuator 152 may include a carrier 154 positioned at an axially aft end of the at least one actuator 152 and configured to translate in a generally axial direction in response to actuation of the at least one actuator 152. In some embodiments, each of the first side beam 48 and the second side beam 52 may include a tab member 156 mounted to a radially outer side of the outer member 60. The tab member 156 may project outward from the outer member 60 to define a narrow gap between the tab member 156 and the outer member 60. The tab member 156 for each of the side beams 48, 52 may engage and retain portions of the first actuation assembly 148 on the first side beam 48 and the second actuation assembly 150 on the second side beam 52. The carrier 154 for each actuation assembly 148, 150 may axially translate within the respective tab member 156. Each actuation assembly 148, 150 may include a first upper linkage 158, an upper crank 160, and a second upper linkage 162. A first end of the first upper linkage 158 may be rotatably connected to the carrier 154 and a second end of the first upper linkage 158 may be rotatably connected to the upper crank 160. The upper crank 160 may be rotatably connected to and mounted between the tab member 156 and the outer member 60. A first end of the second upper linkage 162 may be rotatably connected to the upper crank 160 and a second end of the second upper linkage 162 may be rotatably connected to the upper panel 64. Similarly, each actuation assembly 148, 150 may include a first lower linkage 164, a lower crank 166, and a second lower linkage 168. A first end of the first lower linkage 164 may be rotatably connected to the carrier 154 and a second end of the first lower linkage 164 may be rotatably connected to the lower crank 166. The lower crank 166 may be rotatably connected to and mounted between the tab member 156 and the outer member 60. A first end of the second lower linkage 168 may be rotatably connected to the lower crank 166 and a second end of the second lower linkage 168 may be rotatably connected to the lower panel 66.

Referring to FIG. 12, in some other embodiments, the at least one actuator 152 of each of the actuation assemblies 148, 150 may include a first actuator 152A and a second actuator 152B. A first end of the first actuator 152A may be rotatably mounted to the upper panel 64 and a second end of the first actuator 152A may be rotatably mounted to the outer member 60 of the respective side beam 48, 52. A first end of the second actuator 152B may be rotatably mounted to the lower panel 66 and a second end of the second actuator 152B may be rotatably mounted to the outer member 60 of the respective side beam 48, 52. The at least one actuator 152 may include a pneumatic actuator, a hydraulic actuator, an electrical-mechanical actuator, or the like, and the present disclosure is not limited to any particular configuration of the at least one actuator 152. Moreover, the present disclosure is not limited to the use of the nozzle actuation system 146 illustrated in FIGS. 8-13 and other actuation system configurations may be contemplated within the scope of the present disclosure.

Figure 13:
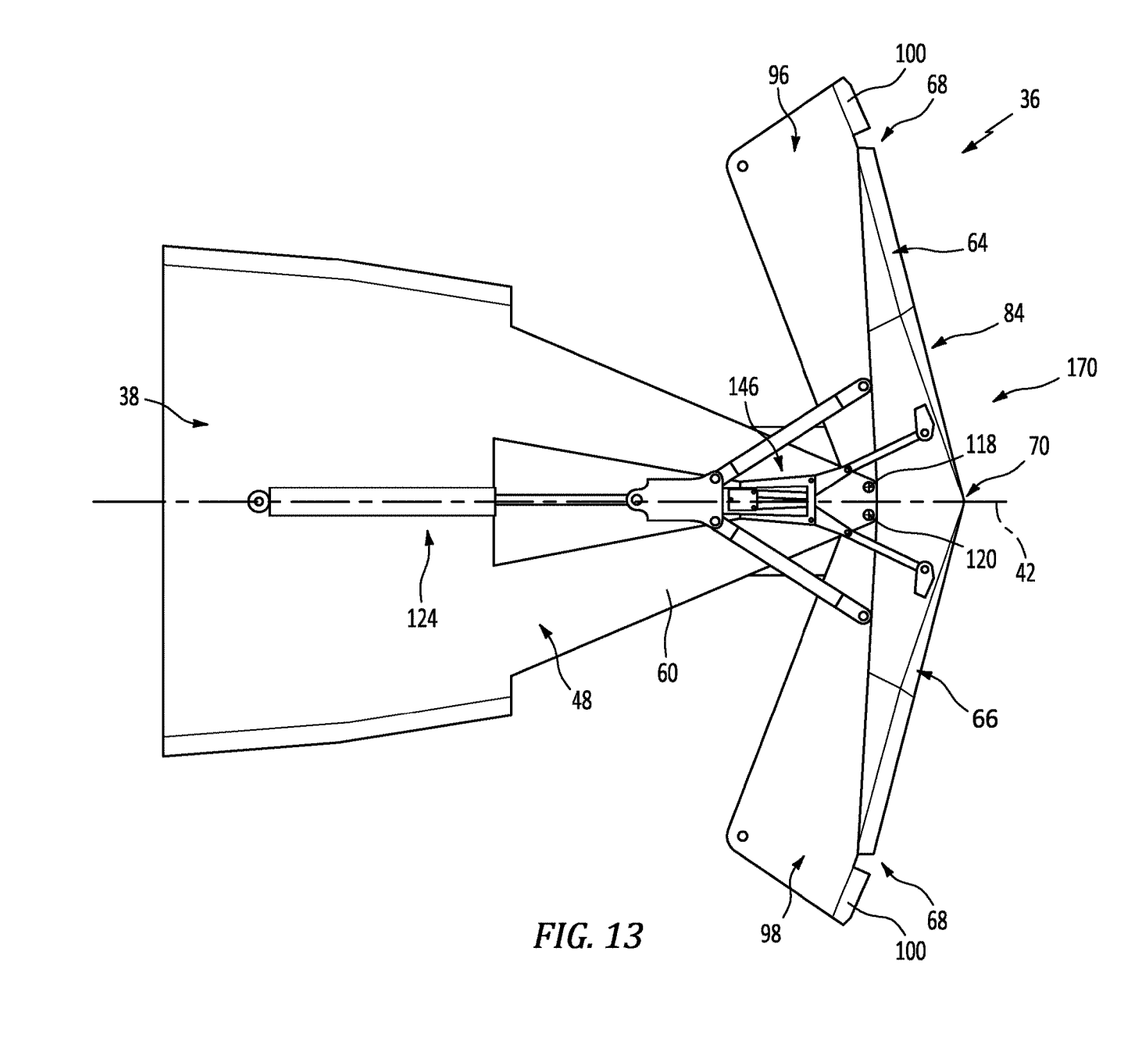
FIG. 13 illustrates a side cutaway view of a variable area nozzle assembly including thrust reverser doors in a deployed position, in accordance with one or more embodiments of the present disclosure.

Referring to FIGS. 10, 11, and 13, the thrust reverser doors 96, 98 may be pivoted about the respective pivot axes 118, 120 between the stowed position shown in FIGS. 10 and 11 and the deployed positioned shown in FIG. 13. The upper panel 64 is configured to remain fixed relative to the upper thrust reverser door 96 as the upper thrust reverser door 96 pivots between the stowed position and the deployed position. Similarly, the lower panel 66 is configured to remain fixed relative to the lower thrust reverser door 98 as the lower thrust reverser door 98 pivots between the stowed position and the deployed position. In this configuration, the thrust reverser actuation system 124 may simultaneously pivot the thrust reverser doors 96, 98 and the panels 64, 66 relative to the fixed structure 38, with the nozzle actuation system 146 accommodating the motion of the thrust reverser doors 96, 98 and the panels 64, 66. Accordingly, the panels 64, 66 and the thrust reverser doors 96, 98 collectively define a post-exit thrust reverser 170 with the thrust reverser doors 96, 98 in the deployed position, by blocking and/or deflecting exhaust gases exiting the nozzle 44. With the upper thrust reverser door 96 and the lower thrust reverser door 98 in the deployed position, the upper panel 64 may contact the lower panel 66 at an axial position which is axially aft of the pivot axes 118, 120 for the thrust reverser doors 96, 98. However, such contact between the upper panel 64 and the lower panel 66 is not required for deployment of the thrust reverser 170. Further, as actuation of the nozzle actuation system 146 is independent of the thrust reverser actuation system 124 and does not effect movement of the thrust reverser doors 96, 98, (e.g., with the thrust reverser doors 96, 98 in the stowed positioned) the nozzle actuation system 146 cannot inadvertently cause thrust reverser 170 deployment when pivoting the upper panel 64 and lower panel 66 to vary the cross-sectional area of the outlet cross-sectional area 94 (see FIGS. 3, 5, 10, and 11).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable area nozzle assembly for a gas turbine engine,
    a fixed structure surrounding an exhaust duct extending along a nozzle axis, the fixed structure defining an exhaust duct outlet of the exhaust duct, the fixed structure including a first side beam and a second side beam, each of the first side beam and the second side beam extending in a direction axially aft from the exhaust duct outlet;
    an upper thrust reverser door and a lower thrust reverser door, each of the upper thrust reverser door and the lower thrust reverser door pivotably mounted to the first side beam and the second side beam at a first axial position; and
    an upper panel and a lower panel, the upper panel and the lower panel directly pivotably mounted to the upper thrust reverser door and the lower thrust reverser door, respectively, at a second axial position located axially forward of the first axial position, the upper panel pivotably mounted to the upper thrust reverser door at a second upper pivot axis located at the second axial position, the upper panel pivotable relative to the upper thrust reverser door about the second upper pivot axis, the lower panel pivotably mounted to the lower thrust reverser door at a second lower pivot axis located at the second axial position, the lower panel pivotable relative to the lower thrust reverser door about the second lower pivot axis, the upper panel and the lower panel defining a nozzle outlet cross-sectional area therebetween;
    wherein the upper thrust reverser door is pivotable relative to the fixed structure about a first upper pivot axis located at the first axial position, the lower thrust reverser door is pivotable relative to the fixed structure about a first lower pivot axis located at the first axial position, and with the upper thrust reverser door and the lower thrust reverser door in the stowed position, the upper panel and the lower panel are pivotable about the second upper pivot axis and the second lower pivot axis, respectively, between a first position in which the upper panel and the lower panel define a maximum cross-sectional area of the nozzle outlet cross-sectional area and a second position in which the upper panel and the lower panel define a minimum cross-sectional area of the nozzle outlet cross-sectional area.

2. The variable area nozzle assembly of claim 1, wherein the nozzle outlet cross-sectional area has a rectangular cross-sectional shape.

3. The variable area nozzle assembly of claim 1, wherein the upper panel is configured to remain fixed relative to the upper thrust reverser door as the upper thrust reverser door pivots between the stowed position and the deployed position and wherein the lower panel is configured to remain fixed relative to the lower thrust reverser door as the lower thrust reverser door pivots between the stowed position and the deployed position.

4. The variable area nozzle assembly of claim 1, wherein, with the upper thrust reverser door and the lower thrust reverser door in the deployed position, the upper panel is configured to contact the lower panel at a third axial position located axially aft of the first axial position.

5. The variable area nozzle assembly of claim 1, wherein each of the upper panel and the lower panel include an inner nozzle flowpath surface extending between a forward axial end of the inner nozzle flowpath surface and an aft axial end of the inner nozzle flowpath surface.

6. The variable area nozzle assembly of claim 1, wherein the upper panel and the lower panel are positioned between the first side beam and the second side beam and wherein each of the upper thrust reverser door and the lower thrust reverser door are pivotably mounted to the first side beam and the second side beam radially outside of the upper panel and the lower panel.

7. The variable area nozzle assembly of claim 6, wherein the first side beam includes a first inner member and a first outer member positioned radially outside of the first inner member and wherein the second side beam includes a second inner member and a second outer member positioned radially outside of the second inner member.

8. The variable area nozzle assembly of claim 7, further comprising a first actuation system mounted to one or both of the first outer member and the second outer member, the first actuation system connected to the upper panel and the lower panel and configured to pivot the upper panel and the lower panel relative to the upper thrust reverser door and the lower thrust reverser door, respectively.

9. The variable area nozzle assembly of claim 6, further comprising a second actuation system mounted to the fixed structure, the second actuation system connected to the upper thrust reverser door and the lower thrust reverser door and configured to pivot the upper thrust reverser door, the lower thrust reverser door, the upper panel, and the lower panel relative to the fixed structure.

10. A method for operating a variable area nozzle assembly for a gas turbine engine, the method comprising:
    pivoting an upper panel of a nozzle about a second upper pivot axis of an upper thrust reverser door, the upper panel directly pivotably mounted to the upper thrust reverser door at the second upper pivot axis, the second upper pivot axis located at a second axial position relative to a nozzle centerline; and
    pivoting a lower panel of a nozzle about a second lower pivot axis of a lower thrust reverser door, the lower panel directly pivotably mounted to the lower thrust reverser door at the second lower pivot axis, the second lower pivot axis located at the second axial position, the upper panel and the lower panel defining a nozzle outlet cross-sectional area therebetween;
    wherein the upper thrust reverser door is configured to pivot about a first upper pivot axis and the lower thrust reverser door is configured to pivot about a first lower pivot axis, and wherein the first upper pivot axis and the first lower pivot axis are located at a first axial position which is axially aft of the second axial position
    wherein the upper thrust reverser door and the lower thrust reverser door are pivotable about the first upper pivot axis and the first lower pivot axis, respectively, between a stowed position and a deployed position, and with the upper thrust reverser door and the lower thrust reverser door in the stowed position, the upper panel and the lower panel are pivotable about the second upper pivot axis and the second lower pivot axis, respectively, between a first position in which the upper panel and the lower panel define a maximum cross-sectional area of the nozzle outlet cross-sectional area and a second position in which the upper panel and the lower panel define a minimum cross-sectional area of the nozzle outlet cross-sectional area.

11. The method of claim 10, wherein the nozzle outlet cross-sectional area has a rectangular cross-sectional shape.

12. The method of claim 10, wherein the upper thrust reverser door and the lower thrust reverser door are pivotably mounted to a first side beam and a second side beam of a fixed structure, the fixed structure surrounding an exhaust duct extending along the nozzle axis, the fixed structure defining an exhaust duct outlet of the exhaust duct, each of the first side beam and the second side beam extending in a direction axially aft from the exhaust duct outlet.

13. The method of claim 12, wherein the steps of pivoting the upper panel and pivoting the lower panel include pivoting the upper panel and pivoting the lower panel with a nozzle actuation system mounted to the first side beam and the second side beam.

14. The method of claim 10, wherein the upper panel is configured to remain fixed relative to the upper thrust reverser door as the upper thrust reverser door pivots between the stowed position and the deployed position and wherein the lower panel is configured to remain fixed relative to the lower thrust reverser door as the lower thrust reverser door pivots between the stowed position and the deployed position.

* * * * *